US012798522B2

(12) United States Patent
Agrotis et al.

(10) Patent No.: US 12,798,522 B2
(45) Date of Patent: Nov. 17, 2026

(54) METHOD AND APPARATUS TO DISPENSE FLUID ONTO A TARGET AREA OF A SURFACE

(71) Applicant: UUSI, LLC, Reed City, MI (US)

(72) Inventors: Demetris A. Agrotis, Canton, MI (US); David Shank, Hersey, MI (US); Edward J. Cox, Marion, MI (US)

(73) Assignee: UUSI, LLC, Reed City, MI (US)

( * ) Notice: Subject to any disclaimer, the term of this patent is extended or adjusted under 35 U.S.C. 154(b) by 659 days.

(21) Appl. No.: 17/862,690

(22) Filed: Jul. 12, 2022

(65) Prior Publication Data

US 2022/0410847 A1 Dec. 29, 2022

Related U.S. Application Data

(63) Continuation-in-part of application No. 16/265,137, filed on Feb. 1, 2019, now Pat. No. 11,407,384.

(60) Provisional application No. 62/639,440, filed on Mar. 6, 2018.

(51) Int. Cl.

| | |
|---|---|
| ***B60S 1/60*** | (2006.01) |
| ***B05B 7/04*** | (2006.01) |
| ***B05B 7/16*** | (2006.01) |
| ***B60S 1/48*** | (2006.01) |

(52) U.S. Cl.
CPC ............ *B60S 1/603* (2013.01); *B05B 7/0483* (2013.01); *B05B 7/168* (2013.01); *B60S 1/481* (2013.01); *B60S 1/487* (2013.01)

(58) Field of Classification Search
CPC ..... B05B 7/0483; B05B 7/168; B05B 7/1693; B05B 7/22; B05B 1/24; B60S 1/50
See application file for complete search history.

(56) References Cited

U.S. PATENT DOCUMENTS

| | | | | |
|---|---|---|---|---|
| 3,915,385 A * | 10/1975 | Hassinger | B60S 1/54 | 239/284.2 |
| 4,248,383 A * | 2/1981 | Savage | B60S 1/48 | 239/284.2 |
| 5,306,350 A * | 4/1994 | Hoy | B05B 12/1418 | 134/22.14 |
| 6,029,908 A | 2/2000 | Petzold | | |
| 6,364,010 B1 | 4/2002 | Richman et al. | | |
| 6,917,693 B1 * | 7/2005 | Kiridena | B60R 1/23 | 348/E7.086 |
| 8,464,968 B2 * | 6/2013 | Le Louarn | B60S 1/481 | 239/284.1 |

(Continued)

*Primary Examiner* — Cody J Lieuwen
(74) *Attorney, Agent, or Firm* — Howard & Howard Attorneys PLLC

(57) ABSTRACT

A device for dispensing liquid onto a target area of a vehicle surface is described, and includes a mixing valve that is in communication with a pressurized fluidic supply system via a fluidic distribution system, and a controller. The mixing valve includes an outlet orifice that is disposed proximal to the target area, and the mixing valve includes first and second valve conduits that are fluidly connected to the outlet orifice via a mixing portion. The first valve conduit includes a first control valve, and the second valve conduit includes a second control valve. The fluidic distribution system includes a first fluidic conduit and a second fluidic conduit. The controller is operatively connected to the fluidic supply system, and the first and second control valves.

25 Claims, 7 Drawing Sheets

(56) References Cited

U.S. PATENT DOCUMENTS

| | | | | |
|---|---|---|---|---|
| 8,474,123 | B1 * | 7/2013 | Wachob | B29C 33/34 29/527.1 |
| 11,407,384 | B2 | 8/2022 | Agrotis et al. | |
| 2003/0222156 | A1 * | 12/2003 | Bissonnette | B60S 1/481 239/284.1 |
| 2003/0234031 | A1 * | 12/2003 | Krause | B60S 1/485 134/36 |
| 2012/0266922 | A1 | 10/2012 | Krahn et al. | |
| 2013/0092758 | A1 | 4/2013 | Tanaka et al. | |
| 2016/0152213 | A1 | 6/2016 | Baerg | |
| 2016/0272164 | A1 | 9/2016 | Hsiao et al. | |
| 2017/0299091 | A1 | 10/2017 | Gallucci et al. | |
| 2017/0349150 | A1 * | 12/2017 | Ostergren | B05B 9/002 |
| 2018/0272998 | A1 * | 9/2018 | Schmidt | B05B 7/2424 |
| 2020/0114880 | A1 * | 4/2020 | Hahn | G02B 27/00 |

* cited by examiner

METHOD AND APPARATUS TO DISPENSE FLUID ONTO A TARGET AREA OF A SURFACE

CROSS-REFERENCE TO RELATED APPLICATIONS

This application is a continuation-in-part and claims the benefit of U.S. patent application Ser. No. 16/265,137, filed on Feb. 1, 2019, which claims the benefit of U.S. Provisional Patent Application No. 62/639,440, filed on Mar. 6, 2018, the disclosures of both are expressly hereby incorporated by reference.

INTRODUCTION

Spatial sensing devices, such as cameras, radars, lidars, etc., that may be disposed on a vehicle, have lenses or other outer surface portions that serve to separate and thus protect sensing elements from external elements. Such protection may include protection from impingement of water, snow, mud, road salt, dust and other airborne elements. When elements precipitate onto lenses or other outer surface portions, they can cloud or otherwise reduce efficacy of the spatial sensing device, and thus affect its ability to monitor a field-of-view. One result can include delaying or otherwise reducing an ability to perform dynamic object detection employing information that is captured by the spatial sensing device. On a vehicle employing autonomous operation, reduction in an ability to dynamically detect objects or perform another sensing function may affect a capability of the autonomous operation, which may lead to disablement of the autonomous function until the lens or outer surface portion is cleaned.

SUMMARY

A device for dispensing liquid onto a target area of a vehicle surface is described and includes a mixing valve that is in communication with a pressurized fluidic supply system via a fluidic distribution system, and a controller. The mixing valve includes an outlet orifice that is disposed proximal to the target area, and the mixing valve includes first and second valve conduits that are fluidly connected to the outlet orifice via a mixing portion. The first valve conduit includes a first control valve, and the second valve conduit includes a second control valve. The fluidic distribution system includes a first fluidic conduit and a second fluidic conduit. The controller is operatively connected to the fluidic supply system, and the first and second control valves.

An aspect of the disclosure includes a first check valve disposed upstream of the first control valve and a second check valve disposed upstream of the second control valve.

Another aspect of the disclosure includes the mixing valve including an outlet orifice that is disposed proximal to the target area.

Another aspect of the disclosure includes a heat source being in thermal communication with the liquid, wherein the controller is operatively connected to the heat source.

Another aspect of the disclosure includes the heat source being disposed proximal to one of the first and second valve conduits to effect thermal communication with the liquid.

Another aspect of the disclosure includes the heat source being disposed proximal to one of the first and second valve conduits to effect thermal communication with the liquid.

Another aspect of the disclosure includes the heat source being disposed proximal to the mixing portion to effect thermal communication with the liquid.

Another aspect of the disclosure includes the heat source being disposed in one of the first fluidic conduit or the second fluidic conduit to effect thermal communication with the liquid.

Another aspect of the disclosure includes the mixing portion of the mixing valve being configured as a T arrangement to fluidly connect the first and second conduits to the outlet orifice.

Another aspect of the disclosure includes the mixing portion of the mixing valve being configured as a Y arrangement to fluidly connect the first and second conduits to the outlet orifice.

Another aspect of the disclosure includes the mixing portion of the mixing valve being configured as a venturi arrangement to fluidly connect the first and second conduits to the outlet orifice.

Another aspect of the disclosure includes the fluidic supply system being pressurized.

Another aspect of the disclosure includes the controller being operatively connected to the first and second control valves to dispense air onto the target area of the vehicle surface.

Another aspect of the disclosure includes the controller being operatively connected to the first and second control valves to dispense liquid onto the target area of the vehicle surface.

Another aspect of the disclosure includes the controller being operatively connected to the first and second control valves to dispense a mixture of air and liquid onto the target area of the vehicle surface.

Another aspect of the disclosure includes the target area being one of a headlamp lens, a taillamp lens, a lens disposed on a lidar device, a lens disposed on a radar device, a lens disposed on an ultrasonic device, or a lens disposed on a camera.

Another aspect of the disclosure includes the target area being an external surface that is associated with a sensing device that is disposed on-vehicle at one of a sideview mirror or sideview mirror area, a rearview mirror or a rearview mirror mounting area, a roof area, a headlamp, a front grille area, a taillamp, quarter panel areas, or a rear license plate area.

Another aspect of the disclosure includes the controller being operatively connected to the first control valve via a first electrical conduit, and the controller being operatively connected to the second control valve via a second electrical conduit.

Another aspect of the disclosure includes the controller being in communication with a second controller.

Another aspect of the disclosure includes a method of providing a heated cleaning fluid and heated air to a vehicle surface, said method including the steps of providing a module for heating washer fluid and air, providing an inlet fluid path for routing pressurized fluid and air into the module, providing an outlet fluid path in fluid communication with the inlet fluid path for dispensing an amount of heated fluid and heated air to a nozzle that is disposed to spray heated fluid and heated air onto the vehicle surface, dispensing the heated fluid and heated air onto the vehicle surface upon receiving a message indicating a need for cleaning the vehicle surface.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 3-1, 3-2 and 3-3 schematically show first, second and third embodiments, respectively, of mixing valves for dispensing fluid onto a target area of a vehicle surface, in accordance with the disclosure.

FIG. 4-1 schematically shows a cross-section of an embodiment of a conduit that is disposed in an embodiment of the fluid dispensing system to transfer fluid from the pressurized fluidic supply system and the fluidic distribution system to an embodiment of the mixing valves, the conduit being in the form of a single fluidic conduit and embedded electrical cables, in accordance with the disclosure.

FIG. 4-2 schematically shows a cross-section of another embodiment of a conduit that is disposed in an embodiment of the fluid dispensing system to transfer fluid from the pressurized fluidic supply system and the fluidic distribution system to an embodiment of the mixing valves, the conduit being a single fluidic conduit including embedded electrical cables, in accordance with the disclosure.

FIG. 4-3 schematically shows a cross-section of an embodiment of a conduit that is disposed in an embodiment of the fluid dispensing system to transfer fluid from the pressurized fluidic supply system and the fluidic distribution system to an embodiment of the mixing valves, the conduit being a dual fluidic conduit including embedded electrical cables, in accordance with the disclosure.

FIG. 4-4 schematically shows a cross-section of another embodiment of a conduit that is disposed in an embodiment of the fluid dispensing system to transfer fluid from the pressurized fluidic supply system and the fluidic distribution system to an embodiment of the mixing valves, the conduit being a dual fluidic conduit including embedded electrical cables, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. As employed herein, the term "upstream" and related terms refer to elements that are towards an origination of a flow stream relative to an indicated location, and the term "downstream" and related terms refer to elements that are away from an origination of a flow stream relative to an indicated location. Furthermore, the disclosure, as illustrated and described herein, may be practiced in the absence of an element that is not specifically disclosed herein. Like numerals refer to like elements throughout the specification and drawings.

Figure 1:
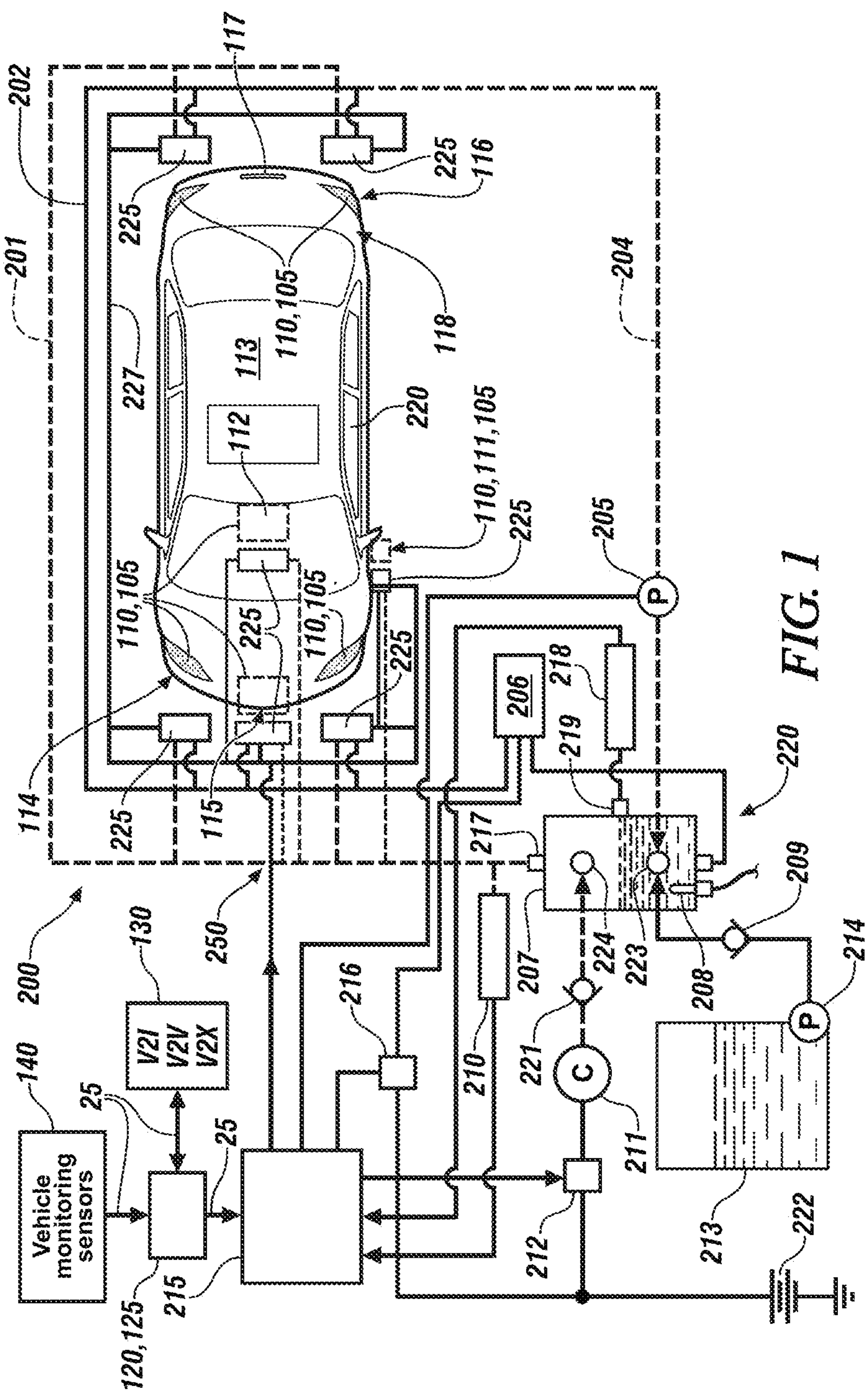
FIG. 1 schematically shows an embodiment of a fluid dispensing system including a pressurized fluidic supply system and a first embodiment of a fluidic distribution system for dispensing fluid onto target areas of a vehicle surface, in accordance with the disclosure.
Figure 2:
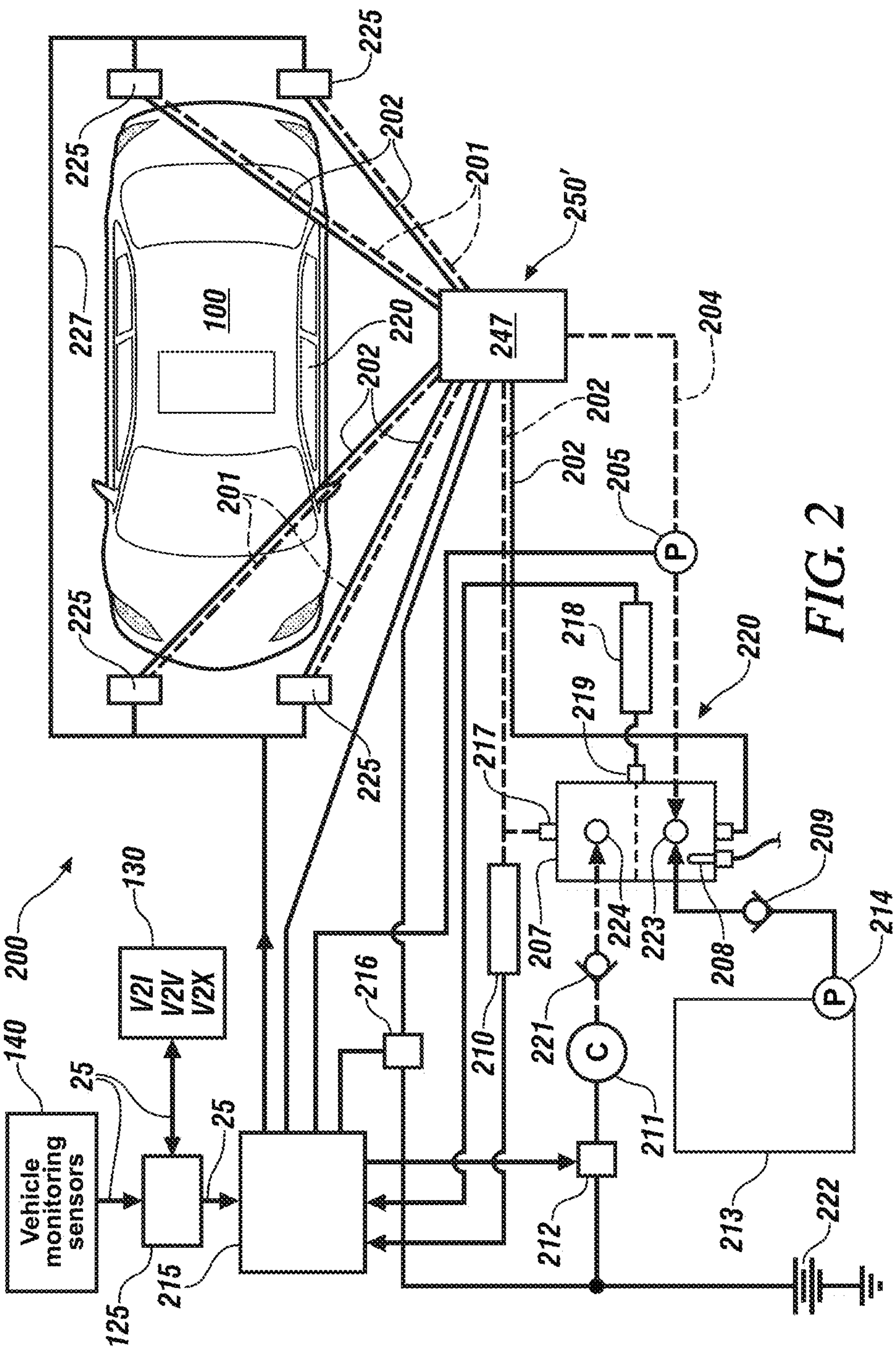
FIG. 2 schematically shows a second embodiment of a fluid dispensing system including a pressurized fluidic supply system and a second embodiment of a fluidic distribution system for dispensing fluid onto target areas of a vehicle surface, in accordance with the disclosure.

Referring now to the drawings, which are provided for the purpose of illustrating certain exemplary embodiments only and not for the purpose of limiting the same, FIGS. 1 and 2 schematically illustrate embodiments of a fluid dispensing system 200 for dispensing liquid onto a target area of a surface, wherein the surface may be disposed on a vehicle 100 in one embodiment. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The vehicle 100 may be equipped with various external spatial sensing devices 105 having external surfaces 110 that can be subjected to the external environment, including impingement by water, dust, dirt, snow, and other detritus. Examples of external spatial sensing devices 105 may include a digital camera, a radar device, a lidar device, etc., which may be disposed proximal to one of the external surfaces 110. Non-limiting examples of locations where the external spatial sensing devices 105 may be disposed include sideview mirrors or sideview mirror area 111, a rearview mirror and/or a rearview mirror mounting area 112, a roof area 113, headlamps 114, a front grille area 115, taillamps 116, a rear license plate area 117, a quarter panel area 118, etc. In one embodiment, the vehicle 100 includes a controller 120, a plurality of vehicle monitoring systems 140, and extra-vehicle communication devices 130. In one embodiment, the controller 120 further includes an autonomous controller 125 that implements autonomous vehicle functionalities in one embodiment. The external spatial sensing devices 105 are in communication with the controller 120 and/or the autonomous controller 125.

The autonomous controller 125 is configured to effect autonomous vehicle operation. Autonomous vehicle functionality may include an on-vehicle control system that is capable of providing a level of driving automation. The terms 'driver' and 'operator' describe the person responsible for directing operation of the vehicle 100, whether actively involved in controlling one or more vehicle functions or directing autonomous vehicle operation. Driving automation can include a range of dynamic driving and vehicle operations. Driving automation can include some level of automatic control or intervention related to a single vehicle function, such as steering, acceleration, and/or braking, with the driver continuously having overall control of the vehicle 100. Driving automation can include some level of automatic control or intervention related to simultaneous control of multiple vehicle functions, such as steering, acceleration, and/or braking, with the driver continuously having overall control of the vehicle 100. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 100 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc.

When the external spatial sensing device 105 is a camera, it may be advantageously mounted and positioned on the vehicle 100 in a location that permits capturing images of a field-of-view (FOV), wherein at least a portion of the FOV includes a travel surface that is forward of the vehicle 100. The FOV may also include a surrounding environment, including, e.g., vehicle traffic, roadside objects and other features, the sky and a horizon. The camera may be disposed on a forward portion of the vehicle 100 to monitor an FOV that is in front of the vehicle 100, thus capturing images that include the lane of travel and on-coming traffic forward of the vehicle 100. Alternatively, or in addition, other cameras may also be employed, including, e.g., a second camera that is disposed on a rear portion of the vehicle 100 to monitor an FOV that is rearward of the vehicle 100, thus capturing images that include the lane of travel and, traffic that is behind the vehicle 100. Another camera may be disposed on a side portion of the vehicle 100 to monitor an FOV that is on one of the right or left sides of the vehicle 100, thus capturing images that include one side-view of the vehicle 100. Other cameras may be disposed elsewhere on the vehicle 100, and one or more of the cameras may be configured to monitor multiple FOVs employing lens configurations such as a fisheye lens, or employing rotating or pivoting arrangements.

Each of the external spatial sensing devices 105 may be equipped with a mechanism in the form of a sensor and/or an analytical scheme that is able to evaluate clarity of each of the external surfaces 110 associated with the target areas. The clarity of each of the external surfaces 110 can be evaluated employing an image analysis technique, an evaluation of light intensity, or another evaluation technique that renders an output that indicates a need to initiate spraying of liquid and/or air onto the external surface 110 to effect cleaning thereof.

The vehicle monitoring systems 140 include, by way of non-limiting examples, a vehicle speed sensor, an ambient temperature sensor, a Global Positioning System (GPS) sensor, etc. The extra-vehicle communication devices 130 include, by way of non-limiting examples, devices and systems that are capable of vehicle-to-vehicle (V2V) communication, vehicle-to-infrastructure (V2I) communication, and vehicle-to-everything (V2X) communication.

The fluid dispensing system 200 is disposed on-vehicle to dispense fluid, in the form of pressurized liquid and/or air, onto one or a plurality of the target areas of a surface of the vehicle 100. The target areas include the external surfaces 110 that are disposed on the sideview mirror area 111, the rearview mirror mounting area 112, a roof area 113, headlamps 114, front grille area 115, taillamps 116, rear license plate area 117, quarter panel area 118, etc., and are associated with one or more of the various external spatial sensing devices 105.

The fluid dispensing system 200 includes a pressurized fluidic supply system 220 that fluidly connects via a fluidic distribution system 250 to one or a plurality of mixing valves 225, wherein individual ones of the mixing valves 225 are disposed proximal to the target areas, i.e., proximal to one of the external surfaces 110 associated with one or more of the various external spatial sensing devices 105. Each of the mixing valves 225 is disposed to controllably dispense fluid, in the form of pressurized liquid and/or air, onto one or a plurality of the aforementioned target areas of the vehicle 100. The dispensed liquid may be water, windshield washer fluid, or another liquid. Each of the mixing valves 225 may have a housing 226 with a heat source 243 disposed therein, as described with reference to FIGS. 3-1, 3-2 and 3-3. These arrangements may facilitate rapid heating of the air and/or liquid present in the mixing valves 225 such that when it is desired to energize one of the mixing valves 225, the air and liquid within is either already heated or will be rapidly heated so that the mixing valve 225 is able to dispense heated liquid and/or air to an emitting nozzle or nozzles that directs the flow of the liquid and/or air onto the proximal target area that includes the external surface 110 on which cleaning may be required. Operation of the fluid dispensing system 200 is controlled and monitored by a fluid dispensing controller 215, which is in communication with the controller 120.

The pressurized fluidic supply system 220 includes a fluidic reservoir 213 including a fluidic pump 214, a pressure vessel 207, and a compressed air source 211, and the fluid dispensing controller 215 in one embodiment. In one embodiment, the fluidic reservoir 213 is a part of a windshield washer system (not shown) for the vehicle 100. Alternatively, the fluidic reservoir 213 is a stand-alone device that is refilled separately from the windshield washer system, which enables use of liquid that is of a different composition or different concentration from windshield washer fluid. The composition may be made of different types of alcohols, for example such as methanol, isopropyl, ethanol, etc., and different concentrations of the alcohols, for example such as 50% by weight or volume of methanol, 40% isopropyl, 10% ethanol.

Figure 7:
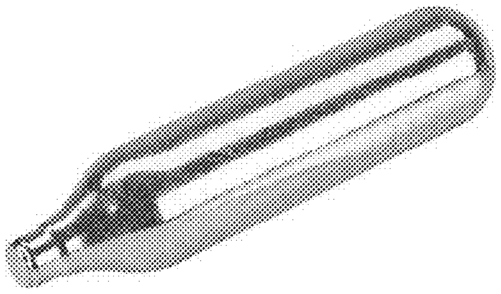
FIG. 7 is a perspective view of a pre-charged, replaceable, pressure cylinder used with the fluidic distribution system of FIG. 1 and FIGS. 4-1, 4-2, and 4.3.

A first embodiment of the fluid dispensing system 200 including a first fluidic distribution system 250 is shown with reference to FIG. 1 and FIGS. 4-1, 4-2, and 4-3, and includes the pressure vessel 207, which is fluidly connected to the compressed air source 211. In one embodiment, the pressure vessel 207 includes a liquid reservoir portion, with a liquid port that fluidly connects via the first fluidic distribution system 250 to distribute liquid to each of the mixing valves 225 and an air port 217 that fluidly connects via the first fluidic distribution system 250 to distribute pressurized air to each of the mixing valves 225. A heat source 208 may be disposed in the pressure vessel 207 to heat any fluid disposed therein. Alternatively, the heat source 208 may include engine or transmission coolant, battery pack coolant, or solar energy collector that is thermally coupled to the liquid or air of the system to transfer heat. In one embodiment, the compressed air source 211 is a stand-alone air compressor. In one embodiment, the compressed air source 211 includes an air compressor that is disposed to supply compressed air to another on-vehicle system, such as an air brake, a ride leveling system, a ride control system, or another on-vehicle system. In one embodiment compressed air source 211 is a pre-charged, replaceable, pressure cylinder as shown in FIG. 7. Said cylinder is pre-charged with air, CO2, nitrogen, or other advantageous gas. Use of a replaceable pressure cylinder eliminates the need for an air compressor, thereby saving weight and power consumption. In one embodiment the pressure vessel 207 includes only a liquid reservoir portion, with a liquid port that fluidly connects via the first fluidic distribution system 250 to distribute liquid to each of the mixing valves 225, and pressurized air from the compressed air source 211 is supplied to each of the mixing valves 225 via a second pneumatic distribution system. The fluid dispensing controller 215 controls and monitors operation of various aspects of the fluid dispensing system 200. The fluid dispensing controller 215 enables a contactor 212 to provide electrical power from a DC power source 222 to activate the compressed air source 211. Compressed air from the compressed air source 211 flows through a check valve 221 and charges the reservoir or the pressure vessel 207 to a desired pressure with compressed air through a port 224. The desired pressure may be measured by a pressure sensor 210, which is in communication with the fluid dispensing controller 215. The pressure sensor 210 can be connected to a pressure hose or tube (as shown) or connected directly to the pressure vessel 207 through an appropriate interface port. The pressure sensor 210 may be a pressure switch that provides a binary output indicating whether the pressure vessel 207 is at a desired pressure in one embodiment, or alternatively, an analog pressure sensor that provides an output directly correlated to the pressure level. As such, at lower vehicle speeds a lower pressure may be desired than may be commanded at higher vehicle speeds. Operation of the system at lower vehicle speeds may reduce compressor run time and required heating periods, thus reducing energy consumption.

The fluid dispensing controller 215 is configured to control the fluidic pump 214 that is arranged to pump liquid from the fluidic reservoir 213 through a check valve 209 into the pressure vessel 207 through a connection port 223. In one embodiment the fluidic reservoir 213 could take the form of a replaceable cylinder FIG. 7 that contains a fluid that is advantageous in the removal of contaminants. A liquid level sensor 218 may be connected to the pressure vessel 207 through a port 219. The liquid level sensor 218 provides an electrical signal that is indicative of the liquid level in the pressure vessel 207 and is in communication with the fluid dispensing controller 215 such that when a desired liquid level is achieved, the fluidic pump 214 can be de-energized. The liquid level sensor 218 may be a level switch that provides a binary output that indicates whether a desired fill level has achieved, or alternatively, a level sensor having an output that indicates the fill level. When the pressure vessel 207 has liquid at a desired level and air at a desired pressure, the fluid dispensing system 200 is ready to provide the air and liquid through the first fluidic distribution system 250 to one or more of the mixing valves 225. It should be appreciated that the replaceable fluid cylinder provides an operator with a choice of fluids for use to clean contaminants. It should also be appreciated that there can optionally be multiple cylinders with different fluids that can be used separately or in combination to optimize the cleaning fluid. It should further be appreciated that the fluid selection can be selected manually by the operator or automatically by a control.

The fluid dispensing controller 215 is in communication with each of the mixing valves 225 via a communication link 227.

Each of the mixing valves 225 may have a heat source 243 disposed therein, as described with reference to FIGS. 3-1, 3-2 and 3-3 or may have a thermal connection to an external heat source such as engine coolant, battery pack coolant, or solar energy collector. This allows for rapid heating of the air and/or liquid present in the mixing valves 225 such that when it is desired to energize one of the mixing valves 225, the air and liquid within is either already heated or will be heated quickly so that the mixing valve 225 is able to provide the heated liquid and/or air to an emitting nozzle or nozzles that directs the flow of the liquid and/or air onto the proximal surface or surfaces in which cleaning is required.

In one embodiment, a pump 205 may operate to circulate liquid in second fluidic conduits 202 and 204 that return liquid to the pressure vessel 207. While liquid is circulating, the liquid may pass through a heat source 206 that provides heating of the liquid flowing through the second fluidic conduits 202 and 204 so that liquid is heated over time and contained in the pressure vessel 207 and is made available via the first fluidic distribution system 250 to one or more of the mixing valves 225. The heat source 206 may be energized by a device external to the fluid dispensing controller 215 via a relay 216 in one embodiment. The heat source 206 may be an electrically powered resistance heater in one embodiment. Alternatively, the heat source 206 may be in thermal communication with another heat source such as engine or transmission coolant, battery pack coolant, or solar energy collector.

The first fluidic distribution system 250 includes first fluidic conduits 201 to convey pressurized air and second fluidic conduits 202 to convey liquid, which fluidly connect to each of the mixing valves 225 in a series arrangement with spurs leading to individual ones of the mixing valves 225. Example cross-sections of the first fluidic conduits 201 and second fluidic conduits 202 are described with reference to FIGS. 4-1 through 4-4.

FIG. 2 schematically shows a second embodiment of the fluid dispensing system 200, wherein the pressurized fluidic supply system 220 fluidly connects via a second fluidic distribution system 250' to the mixing valves 225. In this embodiment, the first fluidic conduits 201 and second fluidic conduits 202 fluidly connect a manifold 247, which distributes air and liquid individually to each of the mixing valves 225 via first fluidic conduits 201 and second fluidic conduits 202.

Figure 6:
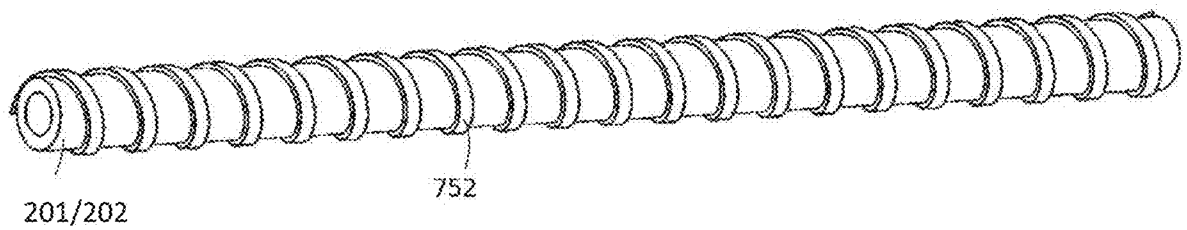
FIG. 6 schematically shows fluid delivery hose with helical heating element.

Because cleaning with heated fluid is more effective, it is important to heat the fluid/air and maintain the temperature until the fluid/air exits a nozzle to be sprayed onto a surface. One way to accomplish this is to have heated hoses that the fluid and air travel in. Referring to FIG. 6 a hose portion is shown representative of hose 201 and/or 202. At least a portion of hose 201 and/or 202 of systems 250 and 250' has an electrically conductive element 752 helically wound around it. It is understood that the physical construction and attachment of the electrically conductive element may be in any form as well as helical. When said electrically conductive element 752 is energized, thermal energy from the element is transferred to hose 201 and/or 202, and in turn the hose transfers thermal energy to the fluid/air contained therein, thereby maintaining and/or increasing the thermal energy of said fluid.

Figures 1, 3:
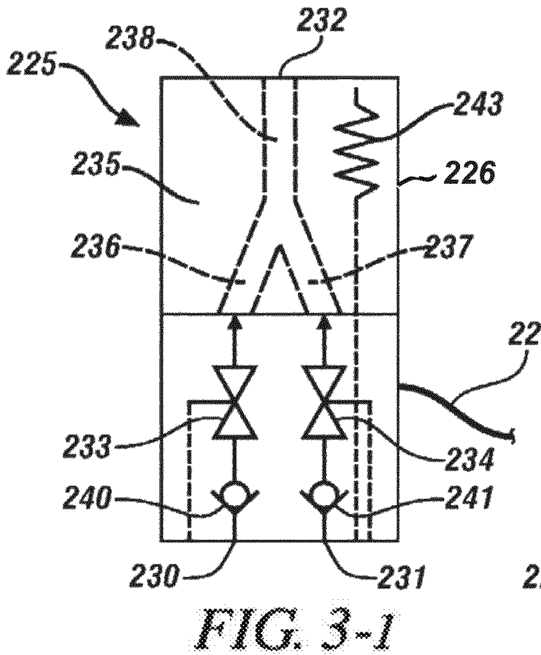
Figures 2, 3:
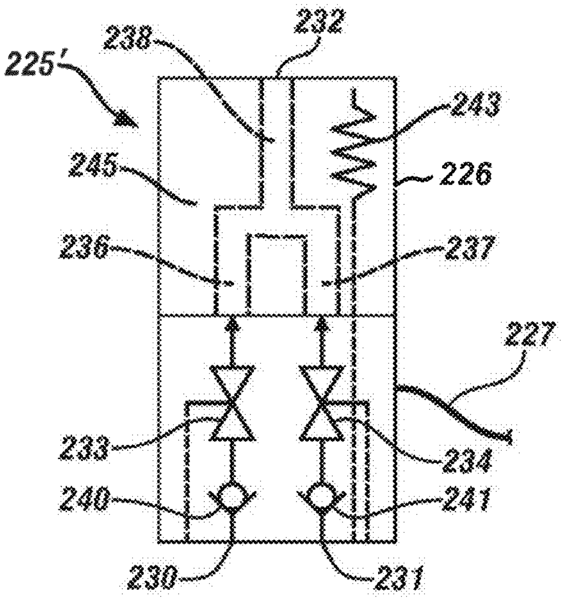
Figure 3:
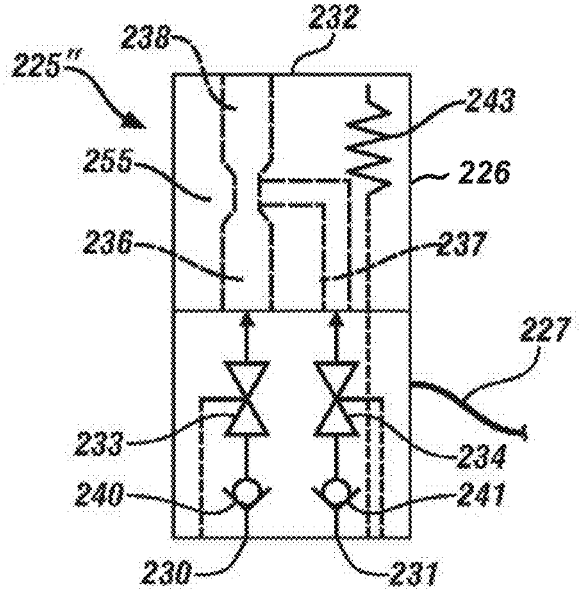

FIG. 3-1 schematically shows a first embodiment of the mixing valve 225, which includes a mixing portion 235 that is fluidly connected to a first valve conduit 236 and a second valve conduit 237. The mixing portion 235 terminates at an outlet orifice 232 that is proximal to one of the aforementioned target areas on the vehicle 100. The first valve conduit 236 includes a first inlet 230 that is fluidly connected to a first check valve 240 that is disposed upstream of a first control valve 233, which is fluidly connected to the first valve conduit 236 of the mixing portion 235. The first inlet 230 is fluidly connected to the first fluidic conduit 201 of the fluidic distribution system 250 of FIGS. 1 and 2, through which pressurized air is conveyed. The second valve conduit 237 includes a second inlet 231 that is fluidly connected to a second check valve 241 that is disposed upstream of a second control valve 234, which is fluidly connected to the second valve conduit 237 of the mixing portion 235. The second inlet 231 is fluidly connected to the second fluidic conduits 202 of the fluidic distribution system 250 of FIGS. 1 and 2, through which pressurized liquid is conveyed. This arrangement of first check valve 240 being disposed upstream of the first control valve 233 and the second check valve 241 being disposed upstream of the second control valve 234 ensures that there is pressurized air and liquid in the mixing valve 225 that is proximal to the respective external surface 110, thus facilitating an immediate response to a control action that includes commanding fluidic flow onto the respective external surface 110.

In this embodiment, the mixing portion 235 is configured such that the first valve conduit 236 and the second valve conduit 237 join together in a Y-configuration to effect mixing of the pressurized liquid and air into a single conduit 238 that terminates at the outlet orifice 232. A heat source 243 is disposed in the mixing valve 225 proximal to one or more of the second valve conduit 237, the mixing portion 235, or the single conduit 238 of the mixing portion 235.

FIG. 3-2 schematically shows a second embodiment of the mixing valve 225', which includes a mixing portion 245 that is fluidly connected to the first valve conduit 236 and the second valve conduit 237. In this embodiment, the mixing portion 245 is configured such that the first valve conduit 236 and the second valve conduit 237 join together in a T-configuration to effect mixing of the pressurized liquid and air into the single conduit 238 that terminates at the outlet orifice 232.

FIG. 3-3 schematically shows a third embodiment of the mixing valve 225'', which includes a mixing portion 255 that is fluidly connected to the first valve conduit 236 and the second valve conduit 237. In this embodiment, the mixing portion 245 is configured such that the first valve conduit 236 and the second valve conduit 237 join together in a venturi configuration to effect mixing of the pressurized liquid and air into the single conduit 238 that terminates at the outlet orifice 232.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link, and is indicated by line 25. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

A parameter is defined as a measurable quantity that represents a physical property of a device or other element that is discernible using one or more sensors and/or a physical model. A parameter can have a discrete value, e.g., either "1" or "0", or can be infinitely variable in value.

Figures 1, 4:
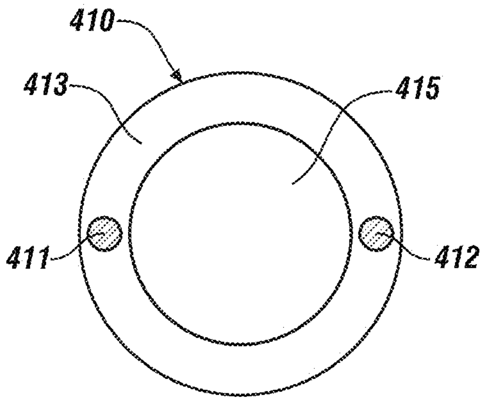
Figures 2, 4:
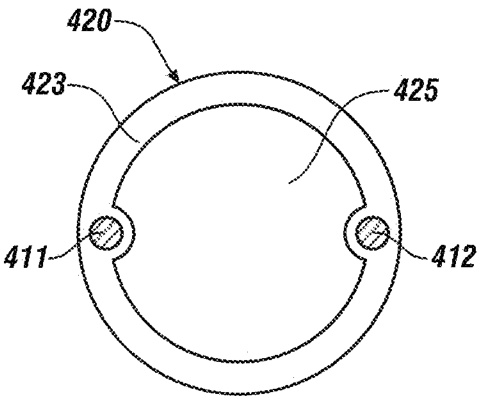
Figures 3, 4:
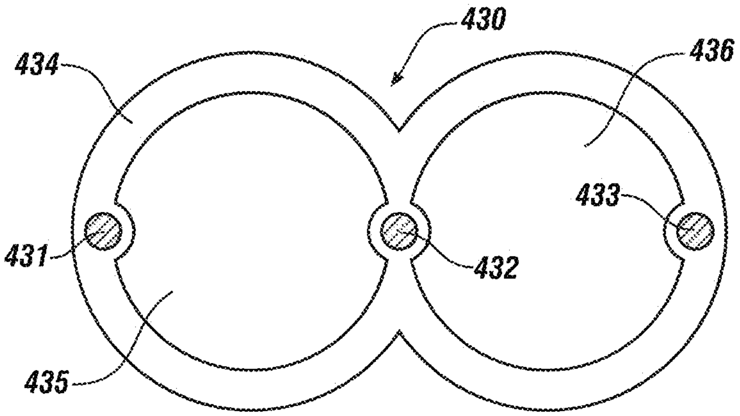
Figure 4:
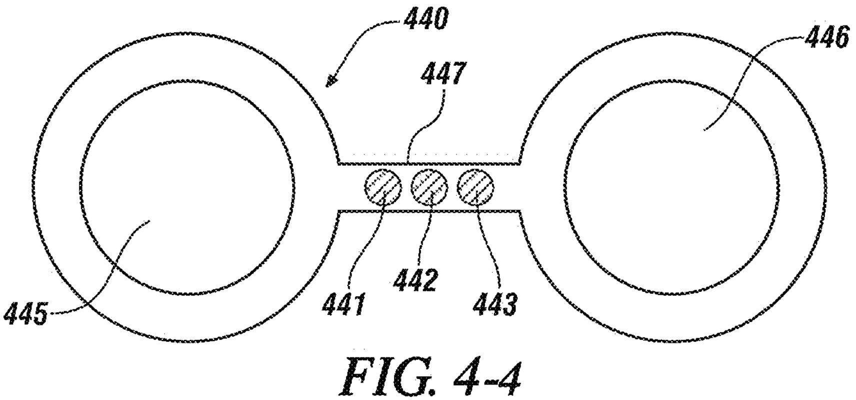

FIGS. 4-1 through 4-4 schematically illustrate embodiments of cross-sections of conduits, e.g., the first fluidic conduits 201 and second fluidic conduits 202 that may be disposed in an embodiment of the fluid dispensing system 200 to transfer fluid from the pressurized fluidic supply system 220 via the fluidic distribution system 250 to an embodiment of one of the mixing valves 225. FIG. 4-1 shows an embodiment of a single fluidic conduit 410 having an annular cross-section with a single fluidic passageway 415 having first and second electrical cables 411 and 412 embedded in a sidewall 413 thereof. In this embodiment, the thickness of the sidewall 413 is sufficient to accommodate the first and second electrical cables 411 and 412 without cross-sectional protrusions. The first and second electrical cables 411 and 412 may be conjoined with, coextruded within, overmolded, wound about an outer surface, disposed in the single fluidic passageway, or otherwise travel with the single fluidic conduit 410. In one embodiment, either or both of the first and second electrical cables 411 and 412 may be spirally wound around the outer surface of the single fluidic conduit 410. The first and second electrical cables 411 and 412 may be employed to conduct electrical control signals to control one or both the first and second control valves 233, 234, or conduct electrical power signals to the heat source 243 of the mixing valve 225. Alternatively, one or both of the first and second electrical cables 411 and 412 may be resistive devices that operate as heating sources in themselves to transfer heat to liquid that is being conveyed therein. Alternatively, each of the mixing valves 225 may be in thermal communication with another heat source such as engine or transmission coolant, battery pack coolant, or a solar energy collector.

FIG. 4-2 shows another embodiment of a single fluidic conduit 420 having an annular cross-section with a single fluidic passageway 425 and first and second electrical cables 421 and 422 embedded in the sidewall 423 thereof. In this embodiment, the sidewall 423 accommodates the first and second electrical cables 421 and 422 with cross-sectional protrusions. The first and second electrical cables 421 and 422 may be conjoined with, coextruded within, or otherwise traveling with the single fluidic conduit 420. The first and second electrical cables 421 and 422 may be conjoined with, coextruded within, overmolded, wound about an outer surface as shown in FIG. 6, disposed in the single fluidic passageway 425, or otherwise travel with the single fluidic conduit 420. In one embodiment, either or both of the first and second electrical cables 421 and 422 may be spirally wound around the outer surface of the single fluidic conduit 420. The first and second electrical cables 421 and 422 may be employed to conduct electrical control signals to control one or both the first and second control valves 233, 234, or conduct electrical power signals to the heat source 243. Alternatively, one or both of the first and second electrical cables 421 and 422 may serve as heat sources in themselves to transfer heat to liquid that is being conveyed therein. Also alternatively, the mixing valves 225 may be in thermal communication with a heat source such as engine or transmission coolant, battery pack coolant, or solar energy collector.

FIG. 4-3 shows an embodiment of a dual fluidic conduit 430 having conjoined first and second fluidic passageways 435, 436, respectively, and first, second and third electrical cables 431, 432, and 433 embedded in the sidewall 434. In this embodiment, the sidewall 434 accommodates the first, second and third electrical cables 431, 432 and 433 with cross-sectional protrusions into the passageways. The first second and third electrical cables 431, 432 and 433 may be conjoined with, coextruded within, overmolded, wound about an outer surface, disposed in the single fluidic passageway, or otherwise travel with the dual fluidic conduit 420. In one embodiment, any of the first, second and third electrical cables 43, 432, and 433 may be spirally wound around the outer surface of the dual fluidic conduit 430. The first, second and third electrical cables 431, 432 and 433 may be employed to conduct electrical control signals to control one or both the first and second control valves 233, 234, or conduct electrical power signals to the heat source 243. Alternatively, one or more of the first, second and third electrical cables 431, 432 and 433 may be resistive devices that operate as heat sources in themselves to transfer heat to liquid that is being conveyed therein.

FIG. 4-4 shows an embodiment of a dual fluidic conduit 440 having first and second fluidic passageways 445, 446, respectively, that are joined by a web section 447, with first, second and third electrical cables 441, 442, and 443 embedded in the web section 447. The first, second and third electrical cables 441, 442 and 443 may be employed to conduct electrical control signals to control one or both the first and second control valves 233, 234, or conduct electrical power signals to the heat source 243. Alternatively, one or more of the first, second and third electrical cables 441, 442 and 443 may be resistive devices that operate as heat sources in themselves to transfer heat to liquid that is being conveyed therein. It should be understood that the electrical cables may be outside of the fluidic conduit and may be used for electrical connections only, or may, for example, be in thermal contact, such as spirally wound around the conduit, thereby transferring thermal energy to the fluid. It should also be understood that the electrical cables may be disposed inside of the fluidic conduit and may be used for electrical connections only, or may be used to transfer thermal energy into the fluid contained therein.

Figure 5:
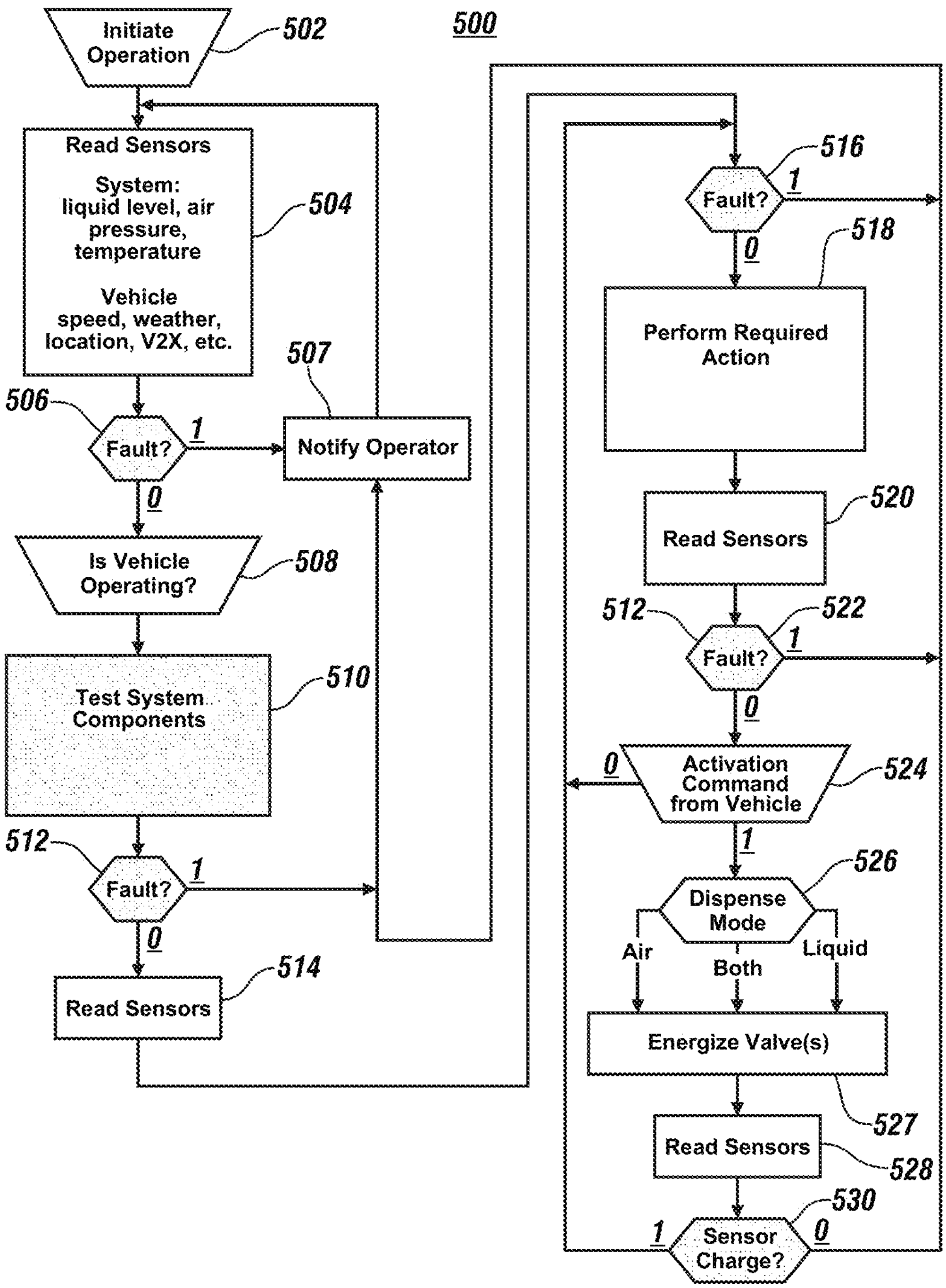
FIG. 5 schematically shows, in flowchart form, an operating routine for monitoring and controlling operation of the fluid dispensing system that is described with reference to FIG. 1, et seq., in accordance with the disclosure.

FIG. 5 schematically shows an operating routine 500 for monitoring and controlling operation of the fluid dispensing system 200 that is described hereinabove. Table 1 is provided as a key wherein the numerically labeled blocks and the corresponding functions are set forth as follows, corresponding to the fluid dispensing system 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 502 | Initiate operation? |
| 504 | Read system sensors, environment sensors |
| 506 | Evaluate readings to determine occurrence of a fault |
| 507 | Abort operation - notify operator |
| 508 | Is vehicle operating? |
| 510 | Test system components |
| 512 | Detect fault? |
| 514 | Read sensors |
| 516 | Detect fault? |
| 518 | Perform required action |
| 520 | Read sensors |
| 522 | Detect Fault? |
| 524 | Detect activation command? |
| 526 | Execute dispense mode |
| 527 | Energize valves |
| 528 | Read sensors |
| 530 | Is there a sensor change? |

Execution of the operating routine 500 may proceed as follows. The steps of the operating routine 500 may be executed in a suitable order, and are not limited to the order described with reference to FIG. 5. As employed herein, the term "1" indicates an answer in the affirmative, or "YES", and the term "0" indicates an answer in the negative, or "NO". The operating routine 500 initiates operation (502), which may be coincident with initiation of vehicle operation. Upon initiating operation, outputs from the external spatial sensing devices 105, the plurality of vehicle monitoring systems 140 and information from the extra-vehicle communication devices 130 are read (504) and evaluated to detect occurrence of a fault or another condition that may preclude operation (506). Operation of the fluid dispensing system 200 may abort with notice to the operator and/or another system (507) upon detecting occurrence of a system fault (506)(1).

When there is no system fault (506)(0), the operating routine 500 verifies that the vehicle 100 is operating (508), and then executes test operations to verify that the components associated with the fluid dispensing system 200 are performing in accordance with specifications (510). Upon detection of a fault associated with the components of the fluid dispensing system 200 (512)(1), operation of the fluid dispensing system 200 may abort with notice to the operator and/or another system (507).

When no fault associated with the components of the fluid dispensing system 200 is detected (512)(0), the on-vehicle sensors associated with the fluid dispensing system 200 are monitored (514) to verify that they are performing in accordance with specifications (516). Upon detection of a fault associated with the sensors of the fluid dispensing system 200 (516)(1), operation of the fluid dispensing system 200 may abort with notice to the operator and/or another system (507).

When no faults are detected (516)(0), the fluid dispensing system 200 performs required actions (518), which can include activating the various elements of the pressurized fluidic supply system 220, including the pump 205, the fluidic pump 214, and/or the compressed air source 211 (520) monitoring various sensors to detect presence system 220 (522)(1), operation of the fluid dispensing system 200 may abort with notice to the operator and/or another system (507). When no fault associated with the components of the pressurized fluidic supply system 220 is detected (522)(0), the fluid dispensing system 200 is ready to operate in a fluidic dispensing mode, which may execute in response to an external command, such as from the fluid dispensing controller 215. An activation command (524)(1) initiates the fluid dispensing mode (526), The fluidic dispensing mode (526) includes controlling the fluid dispensing system 200 and activating either or both the first control valve 233 to dispense air and/or the second control valve 234 to dispense liquid on an individual one of the mixing valves 225 (527). Coincident with operating in the fluidic dispensing mode (526), the sensors are monitoring operation (528), with outputs being monitored. An unexpected deviation in sensor output in response to operation of the fluid dispensing system 200 (530)(1) can cause the fluid dispensing system 200 to abort operation with notice to the operator and/or another system (507). Otherwise, when the sensor output in response to operation of the fluid dispensing system 200 is consistent with expected results (530)(0), this iteration ends. In this manner, operation of the fluid dispensing system 200 can be monitored and evaluated each time it is activated.

The following Clauses provide example configurations of a device for dispensing fluid onto a target area of a surface, as disclosed herein.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A mixing valve to dispense fluid onto a target area of a surface of a vehicle comprising:

the mixing valve adapted to be fluidly connected to a pressurized fluidic supply system via a fluid distribution system and disposed proximal to the target area, the mixing valve including a housing with a mixing portion having a single conduit extending to an outlet orifice, a first valve conduit having a first inlet disposed in the housing, a first check valve disposed in the housing, a first control valve disposed in the housing between the first check valve and the mixing portion, a second valve conduit having a second inlet disposed in the housing, a second check valve disposed in the housing, and a second control valve disposed in the housing between the second check valve and the mixing portion;

wherein a portion of the first valve conduit disposed between the first check valve and the first control valve includes pressurized air;

wherein a portion of the second valve conduit disposed between the second check valve and the second control valve includes pressurized liquid;

wherein the mixing portion is fluidly connected by the single outlet conduit to the outlet orifice, the first valve conduit is fluidly connected to the single conduit, the second valve conduit is fluidly connected to the single conduit, the first control valve is fluidly connected to the first valve conduit, the second control valve is fluidly connected to the second valve conduit, the first check valve is disposed upstream of the first control valve, and the second check valve is disposed upstream of the second control valve; and a heat source disposed within the housing of the mixing portion proximal to the single conduit and the outlet orifice and downstream of the first control valve and the second control valve configured to heat the pressurized air contained in the portion of the first valve conduit disposed between the first check valve and the first control valve and the pressurized liquid contained in the portion of the second valve conduit disposed between the second check valve and the second control valve.

2. The mixing valve of claim 1 wherein the mixing portion is configured as a T arrangement of the first valve conduit and the second valve conduit and the single conduit.

3. The mixing valve of claim 1 wherein the mixing portion is configured as a Y arrangement of the first valve conduit and the second valve conduit and the single conduit.

4. The mixing valve of claim 1 wherein the mixing portion is configured as a venturi arrangement of the first valve conduit and the second valve conduit and the single conduit.

5. A mixing valve for dispensing fluid onto a target area of a surface of a vehicle comprising:

a housing including a mixing portion with a single conduit extending to an outlet orifice disposed proximal to the target area;

first and second valve conduits having inlets disposed within the housing and fluidly connected by the single conduit to the outlet orifice;

a first control valve and a first check valve disposed in the housing and in fluid communication with the first valve conduit, wherein the first control valve is disposed downstream of the first check valve;

a second control valve and a second check valve disposed in the housing and in fluid communication with the second valve-conduit, wherein the second control valve is disposed downstream of the second check valve;

wherein a portion of the first valve conduit disposed between the first check valve and the first control valve includes pressurized air;

wherein a portion of the second valve conduit disposed between the second check valve and the second control valve includes pressurized liquid; and a heat source disposed in the housing of the mixing portion proximal to the single conduit and the outlet orifice configured to heat the pressurized air contained in the portion of the first valve conduit disposed between the first check valve and the first control valve and the pressurized liquid contained in the portion of the second valve conduit disposed between the second check valve and the second control valve.

6. The mixing valve of claim 5 wherein the mixing portion is configured as a T arrangement of the first and second valve conduits and the single conduit.

7. The mixing valve of claim 5 wherein the mixing portion is configured as a Y arrangement of the first and second valve conduits and the single conduit.

8. The mixing valve of claim 5 wherein the mixing portion is configured as a venturi arrangement of the first and second valve conduits and the single conduit.

9. An apparatus to dispense fluid onto a target area of a surface of a vehicle comprising:

a fluidic reservoir including a fluidic pump adapted to pump fluid therefrom;

a pressure vessel fluidly connected to the fluidic reservoir and adapted to receive the pumped fluid;

a compressed air source fluidly connected to the pressure vessel and adapted to provide compressed air to the pressure vessel;

a mixing valve fluidly connected to the pressure vessel and disposed proximal to the target area, the mixing valve including a housing having a mixing portion with a single conduit extending to an outlet orifice, a first valve conduit having a first inlet disposed in the housing, a first check valve disposed in the housing, a first control valve disposed in the housing between the first check valve and the mixing portion, a second valve conduit having a second inlet disposed in the housing, a second check valve disposed in the housing, and a second control valve disposed in the housing between the second check valve and the mixing portion;

wherein the mixing portion is fluidly connected by the single conduit to the outlet orifice, the first valve conduit is fluidly connected to the single conduit, the second valve conduit is fluidly connected to the single conduit, the first control valve is fluidly connected to the first valve conduit, the second control valve is fluidly connected to the second valve conduit, the first check valve is disposed upstream of the first control valve, and the second check valve is disposed upstream of the second control valve;

wherein a portion of the first valve conduit disposed between the first check valve and the first control valve includes pressurized air;

wherein a portion of the second valve conduit disposed between the second check valve and the second control valve includes pressurized liquid; and a heat source disposed in the housing of the mixing portion proximal to the single conduit and the outlet orifice configured to heat the pressurized air contained in the portion of the first valve conduit disposed between the first check valve and the first control valve and the pressurized liquid contained in the portion of the second valve conduit disposed between the second check valve and the second control valve.

10. The apparatus of claim 9 wherein the fluidic reservoir is adapted to be part of a windshield washer system for the vehicle.

11. The apparatus of claim 9 wherein the fluidic reservoir is a stand-alone device that is refilled separately from a windshield washer system for the vehicle.

12. The apparatus of claim 11 wherein the fluidic reservoir includes the fluid that is at least one of a different composition and different concentration from a windshield washer fluid for the vehicle.

13. The apparatus of claim 12 wherein the different composition is made of different types of alcohols and the different concentration is made of different concentrations of the alcohols.

14. The apparatus of claim 9 wherein the compressed air source is a stand-alone air compressor.

15. The apparatus of claim 9 wherein the compressed air source is a pre-charged, replaceable, pressure cylinder.

16. The apparatus of claim 15 wherein the pressure cylinder is pre-charged with at least one of air, CO2, nitrogen, and other advantageous gas.

17. The apparatus of claim 9 wherein the fluidic reservoir is a replaceable cylinder that contains the fluid.

18. The apparatus of claim 9 wherein the fluidic reservoir comprises multiple cylinders with different fluids that can be used separately.

19. The apparatus of claim 18 wherein the fluid can be selected manually by an operator of the vehicle.

20. The apparatus of claim 18 wherein the fluid can be selected automatically by a control.

21. The apparatus of claim 9 wherein the fluidic reservoir comprises multiple cylinders with different fluids that can be used in combination.

22. The apparatus of claim 9 wherein the heat source heats the fluid and air and maintains the temperature until the fluid and air exits a nozzle to be sprayed onto the surface.

23. The apparatus of claim 9 including heated hoses that the fluid and air travel in.

24. The apparatus of claim 23 wherein at least a portion of the hoses has an electrically conductive element wound therearound.

25. The apparatus of claim 24 wherein the electrically conductive element is energized and thermal energy is transferred to the heated hoses and in turn the heated hoses transfer thermal energy to the fluid and air contained therein.

* * * * *